June 12, 1956 H. G. KLEMM ET AL 2,749,694
REVERSIBLE HEAVY DUTY DISC HARROW
Filed Jan. 2, 1952 4 Sheets-Sheet 1

INVENTORS.
Herman G. Klemm,
Guy F. Gardner.
BY
Carlson, Pitzner, Hubbard & Wolfe
ATTORNEYS.

June 12, 1956 H. G. KLEMM ET AL 2,749,694
REVERSIBLE HEAVY DUTY DISC HARROW
Filed Jan. 2, 1952 4 Sheets-Sheet 2

INVENTORS.
Herman G. Klemm,
Guy F. Gardner.
BY
Carlson, Pitzner, Hubbard & Wolfe
ATTORNEYS.

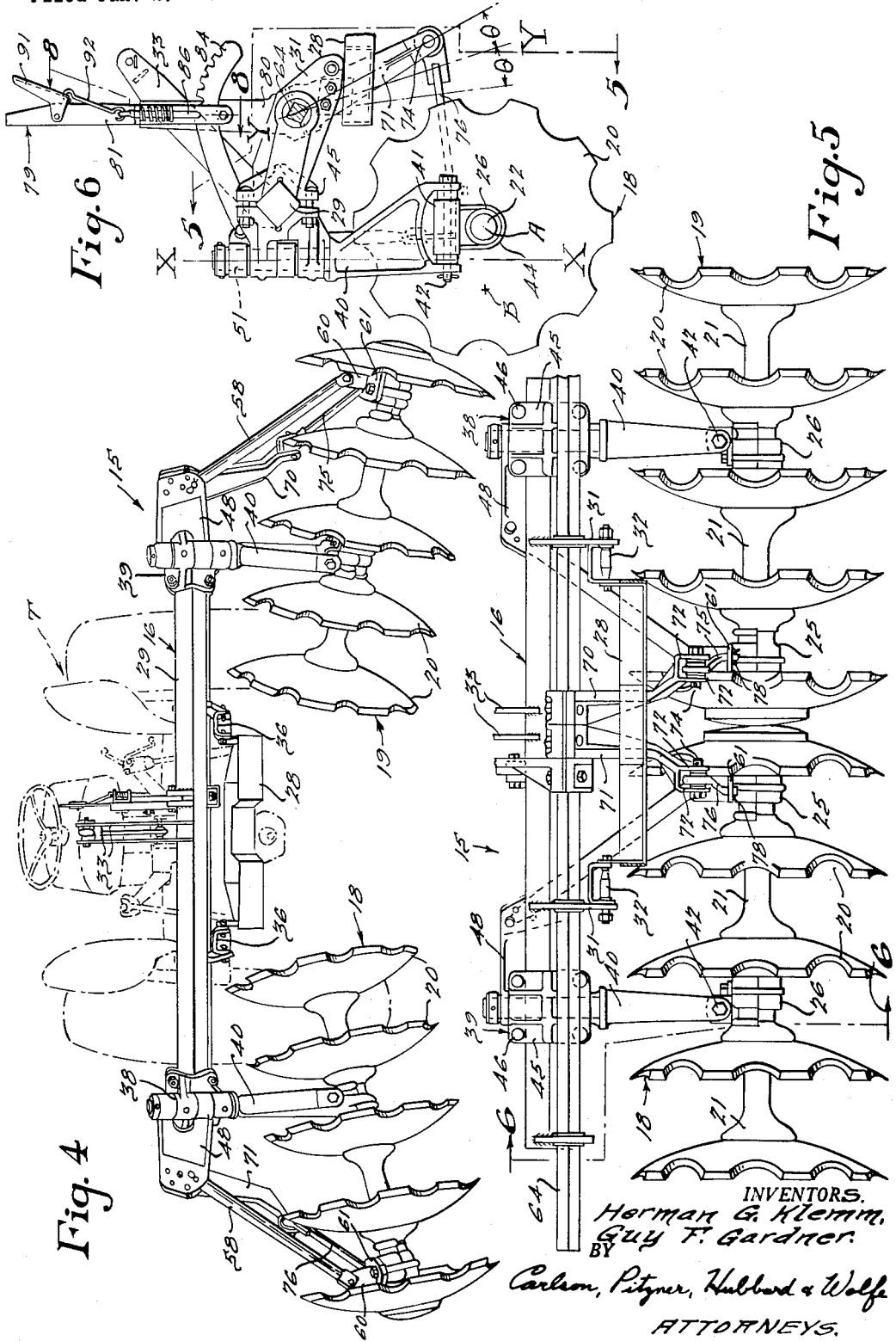

June 12, 1956     H. G. KLEMM ET AL     2,749,694
REVERSIBLE HEAVY DUTY DISC HARROW Filed Jan. 2, 1952     4 Sheets-Sheet 4

INVENTORS.
Herman G. Klemm,
Guy F. Gardner,
BY
Carlson, Pitzner, Hubbard & Wolfe
ATTORNEYS.

United States Patent Office 2,749,694
Patented June 12, 1956

2,749,694

REVERSIBLE HEAVY DUTY DISC HARROW

Herman G. Klemm, Birmingham, and Guy F. Gardner, Dearborn, Mich., assignors to Harry Ferguson, Inc., Detroit, Mich., a corporation of Delaware Application January 2, 1952, Serial No. 264,402

6 Claims. (Cl. 55—81)

The present invention pertains in general to the field of agricultural implements and more specifically to a novel reversible disc harrow finding particular, but not exclusive, utility as a bush and bog harrow.

The invention is particularly well adapted for embodiment in a harrow implement for use with a tractor of the type disclosed in Henry George Ferguson Patent No. 2,118,180, issued May 24, 1938.

One of the objects of the present invention is to provide a reversible heavy duty disc harrow wherein the disc gangs, when in outthrow position, are adapted to maintain their adjacent inner ends in contact throughout their entire range of angling adjustment so as to neutralize the opposed lateral components of the axial ground thrusts without necessity for supplemental adjustments to effect such neutralization. The expression "angling adjustment" refers to adjustment of each disc gang about a generally upright axis. "Outthrow position" refers to that orientation of the disc gangs which causes them to throw earth away from the line of draft, as in straight discing.

Another object is to provide a reversible disc harrow in which the disc gangs, in outthrow position, are also adapted to maintain their inner ends in contact throughout their entire range of pressure or tilt adjustment so as to eliminate the need for making compensating adjustments to insure neutralization of the opposed lateral components of the ground thrusts. By "pressure or tilt adjustment" is meant a rocking adjustment of each disc gang about a generally horizontal axis.

Still another object is to provide a harrow of the character set forth and having reversible disc gangs which are susceptible of positive locking at selected points of tilt adjustment, the gangs also being susceptible of a wide range of lateral adjustment in either outthrow or inthrow position.

A further object of the invention is to provide a tractor-drawn, reversible disc harrow wherein the angling adjustment of the disc gangs in both outthrow and inthrow position can be effected with ease and facility by the tractor driver without dismounting from the tractor.

Still another object of the invention is to provide a harrow implement of the character set forth which will be of simple, economical construction and possessing great mechanical strength and exceptional flexibility in adjustment.

Other objects and advantages will become apparent as the following detailed description proceeds, taken in connection with the accompanying drawings, wherein:

Fig. 4 is a rear elevation similar to Fig. 2 but showing the implement with its disc gangs laterally spaced and reversed, occupying their inthrow position.

Fig. 5 is an enlarged, fragmentary front elevation of the implement per se.

Fig. 6 is an enlarged, broken vertical sectional view through the implement, taken in the plane of the line 6—6 in Fig. 5.

Figure 1:
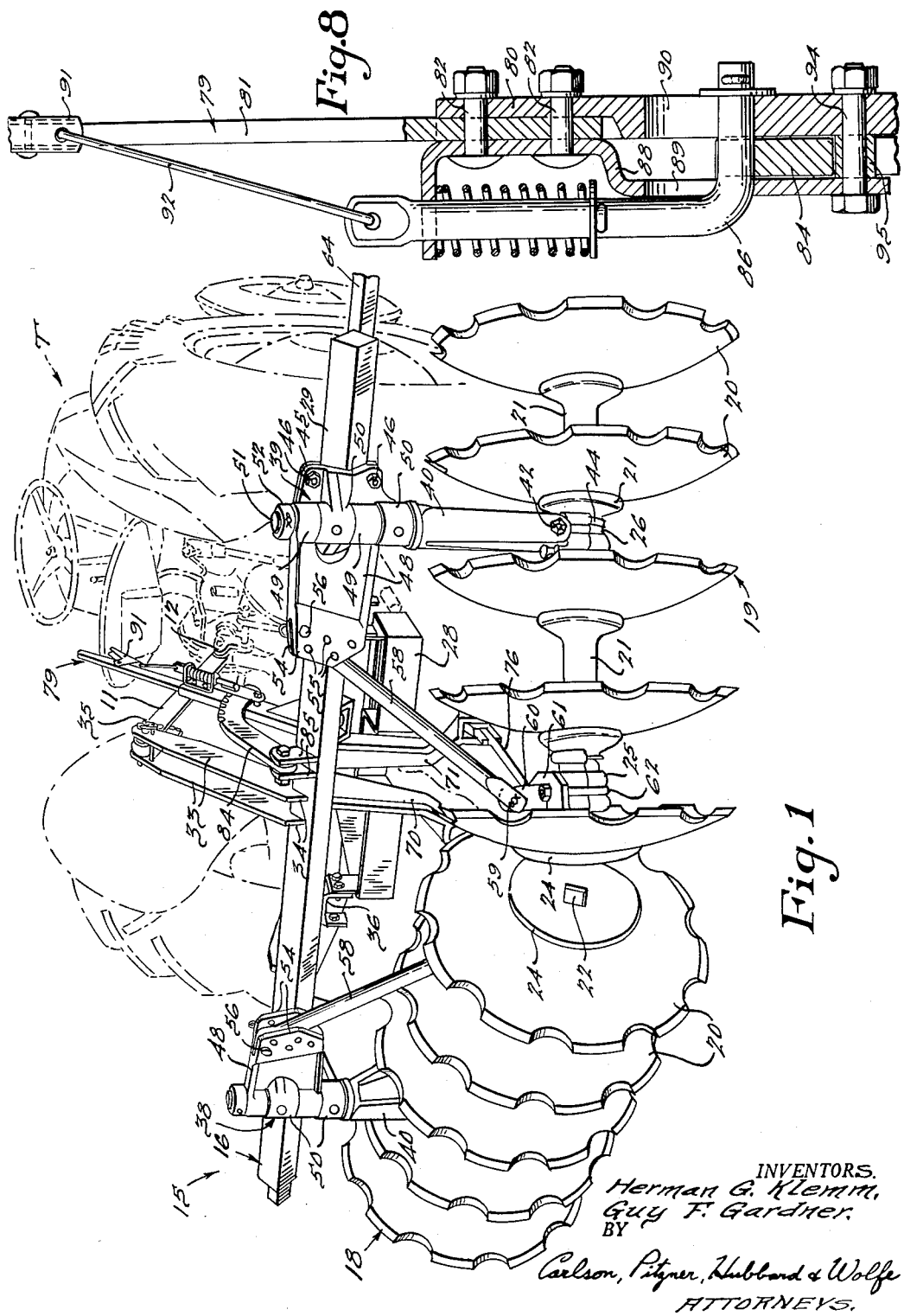
Figure 1 is a perspective view of an illustrative harrow embodying the present invention and showing the harrow hitched in trailed relation to a tractor.

The invention has been exemplified in the drawings as embodied in a harrow implement designed especially for use with the present commercial form of "Ferguson" tractor. It will be appreciated by those skilled in the art, however, that various substitutions or changes in parts, or alternative or modified arrangements may be utilized, particularly in accommodating the harrow to other specific forms of tractors. There is, therefore, no intention to limit the invention to the precise embodiment illustrated herein. On the contrary, the intention is to cover all alternative or equivalent constructions falling within the spirit and scope of the invention as expressed in the appended claims.

The general construction and operation of the illustrated tractor T, including its hydraulically operated hitch linkage, will be familiar to those skilled in the art and, for further details, reference may also be made to Ferguson Patent No. 2,118,180, mentioned above. For present purposes, however, it will suffice to note that the tractor T has a pair of trailing hitch links, or lower draft links, 10 disposed in forwardly converging side-by-side relation. The links 10 are pivoted on the rear end housing below and slightly forward of the rear axle (not shown in detail) and are adapted to be raised and lowered in unison by means of the well-known hydraulic power lift on the tractor. Vertically spaced above and centrally located relative to the lower draft links 10 is a compression link 11 which is pivoted to a control element 12 on the rear end portion of the tractor, the element 12 controlling the hydraulic power lift.

Referring more specifically to the drawings, an illustrative embodiment of the invention is there shown in the form of a heavy-duty, reversible disc harrow 15 disposed in trailed relation with the tractor T. The implement 15 comprises a main frame 16 having appropriate means for detachable connection to the tractor hitch links 10, 11 at vertically spaced points. Dependingly supported from the main frame 16 are a pair of reversible disc gangs 18, 19. Each of the gangs 18, 19 comprises a plurality of discs 20 which in this instance happen to be of the cut-away type. The discs 20 of each gang are disposed in alternate series relation with a plurality of spacer spools 21, the entire disc and spool assembly of each gang being secured together axially by means of an arbor member 22. The arbor 22 may also be utilized to secure a bumper 24 to the convex side of the innermost disc in each gang. Each of the disc gangs 18, 19 is journaled in a pair of supporting thrust bearings 25, 26 which are connected to the main frame 16 by means of suitable supporting and adjusting members. Also supported from the main frame 16 and located forwardly of the center of gravity of the implement is a weight box 28. In this case, the box 28 happens to be of shallow, tray-like construction, being formed from structural bar stock assembled into a rigid entity as by means of welding.

Figure 3:
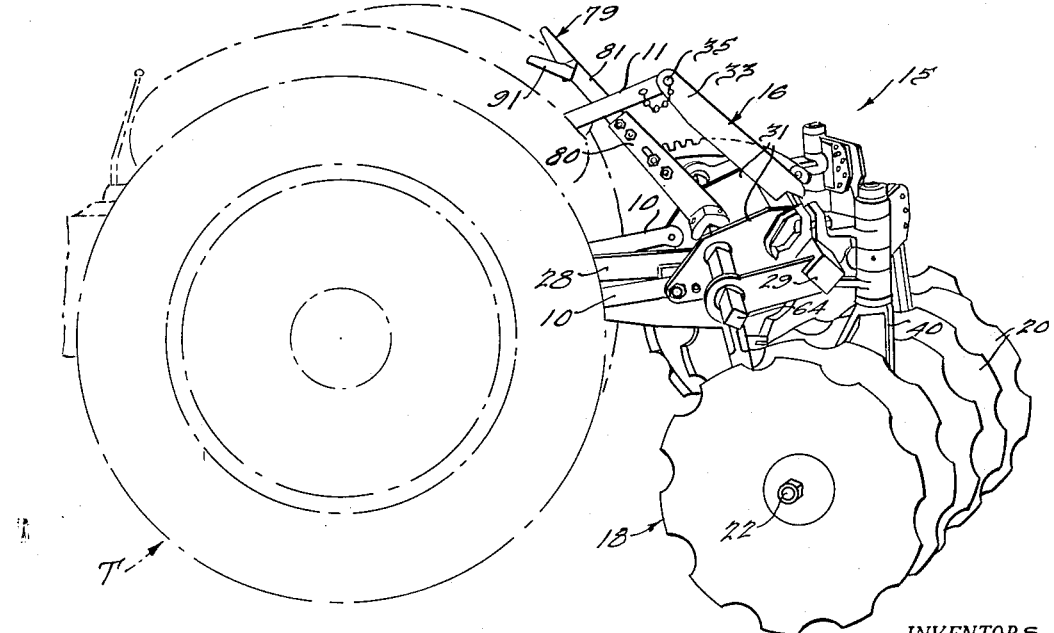
Fig. 3 is a perspective view showing the left side of the implement and rearward portion of the tractor, the implement being in the condition shown in Fig. 1.
Figure 7:
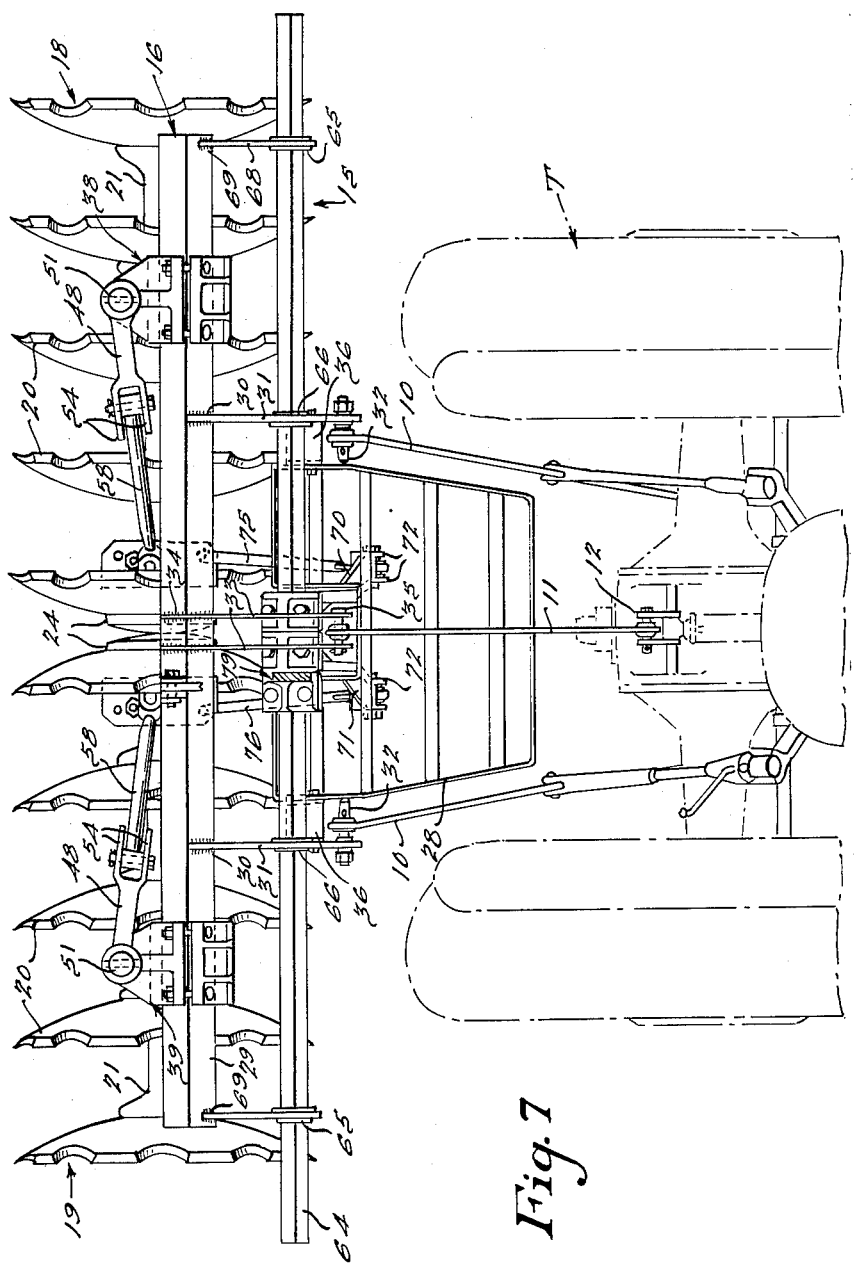
Fig. 7 is a plan view of the illustrative harrow implement and the rear end portion of the tractor, the gangs being disposed in transverse alinement.

Turning now to the main frame 16, it will be perceived that the same is of simple, rugged, and clean-cut construction, being organized about a transverse drawbar 29, preferably of square or rectangular cross section. The drawbar 29 is oriented in such a manner that its particular cross sectional area will provide a maximum resistance to fore and aft bending stresses running along the line of draft. Rigidly fixed to the drawbar 29, as by welds 30, and extending forwardly therefrom are a pair of laterally spaced hitch brackets 31 (Figs. 3, 5 and 7). The latter in this instance are provided with hitch pins 32 at their forward ends and which detachably connect with the trailing ends of the lower draft links 10 of the tractor. In its medial region the drawbar 29 is also provided with a pair of forwardly and upwardly inclined hitch struts 33 rigidly fixed to the drawbar 29 as by welds 34. The hitch struts 33 in this instance are relatively closely spaced and have alined apertures at their upper end for receiving a hitch pin 35 which detachably connects them to the compression link 11 of the tractor. Rigidly secured between the hitch brackets 31, as by means of support brackets 36, and straddled by the brackets 31 is the weight box 28. As indicated particularly in Fig. 7, the box 28 tapers forwardly to provide clearance with the lower draft links 10 and to permit location of suitable ballast forward of the center of gravity of the implement.

By reason of the hitch connections just described, it will be appreciated by those skilled in the art that the harrow 15 is adapted to operate in automatic draft control in conjunction with the hydraulic system of the tractor T. Automatic draft control operation is more fully discussed in the above-mentioned Ferguson Patent No. 2,118,180, and, for present purposes, requires no further attention herein.

In order to permit angling, tilt, and lateral adjustments of the disc gangs 18, 19, as well as combinations of such adjustments, a universal connection is interposed between each of the disc gangs 18, 19 and the main frame 16 and is susceptible of lateral adjustment along the latter. Accordingly, the main frame 16 is provided with a pair of disc gang hinges 38, 39 of identical construction (Figs. 1, 4 and 6). Each of the hinges 38, 39 has a depending yoke-like member in the form of a disc gang pivot 40 journaled therein. Each of the disc gang pivots 40 has a bifurcated lower end pivotally secured to a bushing 41 by means of a pin 42 (Fig. 6). Each bushing 41 is, in turn, secured to a respective one of the intermediate bearings 26 as by means of a U-bolt 44. By reason of the foregoing structure, each of the disc gangs 18, 19 becomes susceptible of a tilt or pressure adjustment about a substantially horizontal axis and also an angling adjustment about a substantially upright axis. Lateral adjustment of the gangs 18, 19 along the drawbar 29, in either outthrow or inthrow position, is achieved by means of a pair of adjustable clamping elements 45 each connected, as by means of bolts 46, to coacting structure on a respective one of the disc gang hinges 38, 39 so as to grip the drawbar 29 therebetween.

Figure 2:
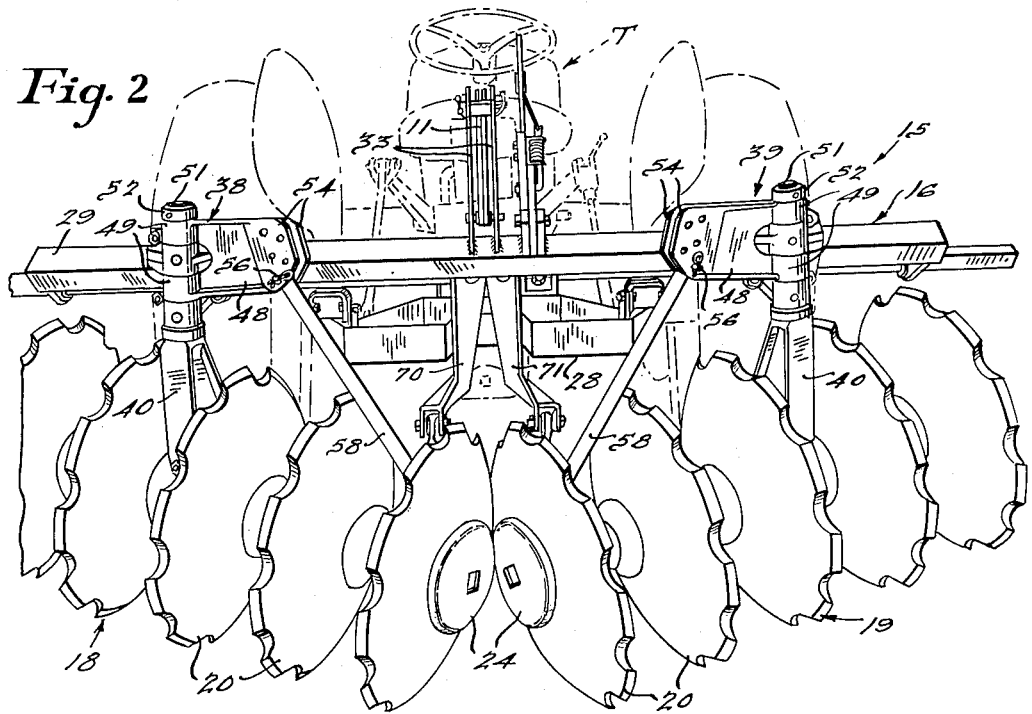
Fig. 2 is a rear elevation of the implement and tractor of Fig. 1, the disc gangs being angled downwardly at their inner ends.

Tilt or pressure adjustment of the disc gangs 18, 19, may readily be effected without interference with the angling adjustment, either with the gangs in outthrow position as illustrated in Figs. 1 and 2 or in inthrow position as shown in Fig. 4. This is accomplished in the present instance by providing a swingable mechanical connection of selectively variable length between one end of each disc gang 18, 19 and its respective one of the disc gang hinges 38, 39 (Figs. 1, 2, 4 and 7). In furtherance of such objective, each of the disc gang hinges 38, 39 has pivoted thereto a gang pressure arm 48. The arm 48 is formed at one end with a pair of spaced-apart bosses 49 of appropriate size to fit in alternate spaced relation with bosses 50 of the disc gang hinge. The upstanding stem 51 of the disc gang pivot 40 serves as a pivotal support for the gang pressure arm 48, the retaining collar 52 of the stem 51 overlying the upper one of the bosses 49 on the arm 48.

The end of each gang pressure arm 48 remote from its pivot bosses 49 terminates in a clevis-like element defined by a pair of spaced apart ears 54 (Figs. 1, 2 and 7). The ears 54 are provided with a plurality of alined apertures 55, any pair of which are adapted to receive a tilt adjusting pin 56. Pivotally attached to the arm 48 by means of the pin 56 is a downwardly inclined member known as a down angle thrust link 58. The lower end of the thrust link 58 is pivotally secured, as by means of a pin 59, to an upstanding lug 60 carried by a bracket 61. Such bracket is rigidly fixed, as by means of U-bolt 62, to end bearing 25 of its associated one of the disc gangs.

By reason of the connection just described, it will be noted that each of the gangs 18, 19 may be positioned at the required angle of tilt for the ditching work contemplated, simply by selection of an appropriately located pair of holes 55 in the gang pressure arm 48, utilizing the pin 56 to secure the upper end of the thrust link 58 by means of the selected holes.

Provision is made in the implement 15 for enabling the tractor driver to effect an angling adjustment of the disc gangs 18, 19, in either outthrow or inthrow position, with ease and facility and without dismounting from the tractor seat. In furtherance of such objective, a transversely disposed angling control shaft 64 is journaled on the main frame 16 and situated slightly forward of the drawbar 29 (see Figs. 1, 2, 5 and 7). The shaft 64 is journaled in a plurality of alined bearings 65, 66. The bearings 65 are mounted in respective ones of a pair of brackets 68 fixed adjacent the ends of the drawbar 29 and in forwardly extending relation therewith, as by means of welds 69. The bearings 66, on the other hand, are mounted in an intermediate position on the forwardly extending hitch brackets 31. Rigidly clamped to the angling control shaft 64, but adjustable axially thereof, is a pair of depending angling control arms 70, 71 of identical form but opposite hand. The arms 70, 71 may have any appropriate structural shape to provide effective resistance to fore-and-aft bending and in the present instance are substantially T-shaped. The lower ends of the arms 70, 71 are turned outwardly from the fore-and-aft center line of the implement and each terminate in a pair of laterally spaced ears 72. Each pair of ears 72 is formed with alined apertures which receive a pivot pin 74 (Figs. 5, 6 and 7). Pivotally connected between the lower ends of the arms 70, 71, by means of the pins 74, is a pair of angle draft links 75, 76 also of identical form but opposite hand. Each of the links 75, 76 extends rearwardly from its associated one of the arms 70, 71, and terminates in a pivotal connection with the bracket 61 on a corresponding one of the disc gang end bearings 25. In the present instance, such connection is effected by bending the rearward end of each link downwardly and inserting it through a suitable aperture in the bracket 61, retaining the link in place as by means of a cotter key 78 (Fig. 5). By reason of the linkage just outlined, it will be noted that rocking of the angling control shaft 64 either forwardly or rearwardly in its bearings 65, 66 will serve to vary the angular position of the gangs 18, 19 about their respective upright axes.

For the purpose of enabling the tractor driver to impart rocking movement to the shaft 64 from this position on the tractor seat, there is fixed to the angling control shaft 64 a forwardly and upwardly inclined angling control lever 79 (Figs. 3, 6 and 8). The lever 79 in the present instance happens to be of non-unitary construction, comprising a base member 80 and a handle 81 secured thereto as by means of bolts 82. The angling control lever 79, the shaft 64, and hence the disc gangs 18, 19 may be secured in various selected positions of angling adjustment by means of a ratchet mechanism associated with the control lever 79.

In this instance, such ratchet mechanism comprises a notched sector 84 pivoted on the drawbar 29 as by means of brackets 85 (Fig. 1), and a spring loaded pawl or locking pin 86 slidably fixed in bracket 88 carried by the lever 79 (Fig. 8). The bracket 88 and the base member 80 of the lever 79 have alined slots 89, 90 which permit movement of the locking pin 86 into and out of the positioning notches in the sector 84. Movement of the pin 86 may readily be accomplished by means of a pivoted hand grip 91 located near the top of the control lever 79 and connected to the locking pin 86 by means of a link 92. The upper portion of the locking pin bracket 88 is secured to the lever 79 by means of the bolts 82 which also secure the elements 80, 81 together. The lower end of the bracket 88 is spaced laterally from the base member 80 so as to sandwich the sector therebetween, being secured to the member 80 as by means of a bolt 94 which may carry a bushing 95 on which the sector 84 rests.

Means are provided for maintaining the adjacent inner ends of the disc gangs 18, 19 in contact throughout their entire range of angling adjustment, when in outthrow position, thus neutralizing the opposed lateral components of the ground thrusts acting on the disc gangs 18, 19 and eliminating any need for supplemental adjustments to effect such neutralization. This is accomplished by mounting each of the disc gangs 18, 19 with its upright pivotal axis offset to the rear of the common rotational axis of its individual discs, by utilizing a particular bumper contour, and by taking advantage of manufacturing tolerances in the supportig members connecting the disc gangs to the main frame of the implement. Referring more specifically to Figs. 6 and 7, it will be perceived that the gang pivot 40 of each disc gang is offset rearwardly from the arbor 22 which defines the common rotational axis of the individual discs. For this purpose, each of the disc pivots 40 is formed with its upstanding pivot stem 51 offset rearwardly with respect to its bifurcated lower end. This, in effect, displaces the center of angling movement of each disc gang to the rear of the common rotational axis of its discs and also to the rear of the common transverse alinement axis of the disc gangs. Thus, as the inboard ends of the disc gangs 18, 19 are angled from a transversely alined position, such as shown in Fig. 7, to an extreme rearward position, such as shown in Fig. 1, these inboard ends tend gradually to approach and then to recede from each other, reaching their closest point when the disc gang hinges 48 and the down-angle thrust links 58 are parallel to the drawbar 29 of the main frame. The bumpers 24 are given a somewhat flattened, convex contour which compensates, to the maximum possible extent, for such approach and recessional movement. That portion of such movement which might not be compensated for by bumper contour is taken up by the lost motion resulting from the manufacturing tolerances in the parts attaching the disc gangs 18, 19 to the drawbar 29 of the main frame. When the harrow 15 is in operation, the inward urge on the disc gangs due to the lateral ground thrust components is more than sufficient to insure that such lost motion will be fully absorbed and that the bumpers 24 will remain in contact throughout the entire range of angling adjustment.

An important advantage of the offset arrangement just described can readily be appreciated if one considers how the gangs would behave if the axis of the stem 51 of each disc gang pivot were coplanar with the axis of the arbor 22 of each disc gang. Under this condition, angling adjustment of the disc gangs from the position of Fig. 7 to that of Fig. 1 would produce no approach movement, but, instead, would produce double the recession undergone by the disc gangs with the offset gang pivots. Under these conditions, it would be impossible to compensate for such recessional movement by bumper contour and manufacturing tolerances alone. Thus each change in angling adjustment would necessitate the making of a supplemental or compensating adjustment to move the disc gangs inwardly and restore contact between the gang bumpers 24 to balance out lateral ground thrust components.

To accommodate the offset construction of the disc gang pivots 40 when the gangs 18, 19 are in reversed or inthrow position, as illustrated in Fig. 4, resort is had to an ingenious arrangement in the angling adjustment connections. Referring to Fig. 6, it will be noted that, when the disc gangs are in outthrow position, the common rotational axis of the individual discs in each gang will be located forwardly of the angling adjustment axis X—X, passing through a point designated by the letter A. On the other hand, when the disc gangs are in their reversed or inthrow position (illustrated in Fig. 4), the forward offset of each disc gange becomes a rearward offset relative to the angling adjustment axis X—X, and the rotational axis of the discs in each gang will then pass through a point designated by the letter B in Fig. 6. To provide a mechanical connection between the angling control shaft 64 and the disc gangs in either outthrow or inthrow position, the angling control arms 70, 71 are constructed with their depending ends offset by an angular distance $\theta$ from their plane Y—Y of registration with the angling control shaft 64. In this instance, the plane Y—Y passes through the diagonally opposite edges of the square shaft 64. Accordingly, when the angling control arms 70, 71 are reversed from the position shown in Fig. 6 and switched to opposite ends of the angling control shaft 64, their depending ends will be offset by an angular distance $\theta$ but on the opposite side of the plane Y—Y. In other words, reversal and end-for-end switching of the angling control bars 70, 71 will shift the position of their depending ends through a total angular distance equal to twice the value of the angle $\theta$. This total distance is just sufficient to compensate for the fore and aft displacement A—B of the disc axes and thereby permit both the angling adjustment arms 70, 71 and the angle draft links 75, 76 to be utilized for either the outthrow or the inthrow position of the disc gangs. In the latter position, as indicated in Fig. 4, these parts are connected to the lugs 60 now located at the outwardly disposed ends of the gangs.

Turning once more to the tilt or pressure adjusting means of the disc gangs 18, 19, it will be perceived that provision has been made for maintaining their inboard ends in contact throughout their entire range of tilt adjustment when in outthrow position so as to avoid completely the necessity for making compensating adjustments to neutralize lateral ground thrust components each time the tilt adjustment is changed. This is accomplished by the simple expedient of minimizing, to a negligible degree, any lateral shift of the disc gangs resulting from a change in tilt adjustment. By locating the center of tilt relatively close to the individual disc axis of each gang, lateral displacement becomes negligible and, by reason of the contour of the bumpers 24 and the manufacturing tolerances in the disc gang supports, the bumpers are adapted to remain in contact throughout the entire range of tilt adjustment. Sliding adjustment of the disc gang hinges 38, 39 along the drawbar 29 as a compensating adjustment is therefore unnecessary.

We claim as our invention:

1. A reversible disc harrow for detachable attachment to a tractor and comprising the combination of an implement frame, means for detachably connecting said implement frame to the tractor, a pair of disc gangs adapted to be reversed between an outthrow and an inthrow position, hinge means disposed between said implement frame and each said gang providing bodily tilt of the latter about a generally horizontal axis spaced below said implement frame and also providing swivel movement of each said gang from an outthrow to an inthrow position about a generally upright axis offset rearwardly from the rotational axis of the individual discs in said gang, a first positive locking means for maintaining each said gang in a selected condition of tilt with said gang in its outthrow as well as its inthrow position, and a second positive locking means for maintaining each said gang in a selected condition of angling adjustment with said gang in outthrow as well as in inthrow position, said second positive locking means including a pair of reversible angling connections.

2. A reversible disc harrow for attachment to a tractor having a hitch linkage trailingly pivoted from its rear end portion, said harrow comprising the combination of a transverse drawbar, means for detachably connecting said drawbar to the tractor hitch linkage, a pair of reversible disc gangs each having an outthrow and an inthrow position, disc gang hinges interposed between said transverse drawbar and respective ones of said disc gangs, each said disc gang hinge providing bodily tilt of its associated gang about a generally horizontal axis spaced substantially below said drawbar, each said disc gang hinge also providing bodily swivel movement of its associated gang about a generally upright axis offset from the common rotational axis of the discs in said gang, means including a down angle thrust link interposed between each said disc gang and each said hinge for positively maintaining the former in a selected condition of bodily tilt, an angling control shaft supported on said transverse drawbar, a pair of angling control arms slidably but non-rotatably fixed to said angling control shaft, each said arm being angularly advanced in one direction relative to a given reference plane running longitudinally of said control shaft, each said arm being reversible relative to said control shaft so as to be advanced in the opposite direction with respect to said reference plane, a pair of angle draft links interposed between respective ones of said angling control arms and said disc gangs, and means including an angling control lever for selectively maintaining said angling control shaft in predetermined angular positions, said angling control lever being disposed in proximity to the tractor seat.

3. In a reversible disc harrow, the combination of a main frame, a pair of reversible disc gangs each adjustable laterally of said main frame and also adjustable angularly about an upright axis offset rearwardly from the common rotational axis of the individual discs in a gang, an angling control shaft journaled on said main frame, a pair of angling control arms slidably but non-rotatably fixed to said angling control shaft, each said arm being angularly advanced in one direction relative to a given diameter of said control shaft, each said arm being reversible relative to said control shaft so as to be advanced in the opposite direction relative to said given diameter, and a mechanical connection between the free end of each said arm and a corresponding one of said discs.

4. In a reversible disc harrow, the combination comprising a transversely disposed implement frame, a pair of reversible disc gangs each susceptible of angling adjustment about an upright axis offset rearwardly from the common rotational axis of its individual discs, an angling control shaft supported on said implement frame, a pair of angling control arms slidably but non-rotatably fixed to said angling control shaft, each said arm being angularly advanced in one direction relative to a given reference plane running longitudinally of said control shaft, each said arm being reversible relative to said control shaft so as to be advanced in the opposite direction relative to said given reference plane, a pair of angle draft links interposed between respective ones of said angling control arms and said disc gangs, and means including an angling control lever for selectively maintaining said angling control shaft in predetermined angular positions.

5. In a disc harrow adapted for hitching in trailed relation to a tractor having a pair of trailingly pivoted lower draft links and a compression link vertically spaced above said draft links, the combination of a transverse drawbar, a plurality of forwardly extending brackets rigidly fixed to said drawbar, certain of said brackets being adapted for detachable connection to the trailing ends of the lower draft links, an upstanding strut fixed to said drawbar and adapted for detachable connection with the compression link on the tractor, a pair of disc gangs, a pair of hinges for supporting ones of said gangs for pivotal movement about both substantially horizontal and vertical axes, a pair of releasable clamps secured to said drawbar and slidable therealong for locking engagement in a range of adjustable positions, said clamps in turn supporting respective ones of said hinges, an angling control shaft journaled in said forwardly extending brackets, means connecting said angling control shaft with said gangs, and a weight box fixed to said certain ones of said forwardly extending brackets.

6. In a disc harrow adapted for hitching in trailed relation to a tractor having a pair of trailingly pivoted lower draft links and a compression link vertically spaced above said draft links, the combination of a transverse drawbar of substantially square cross section, a plurality of forwardly extending brackets rigidly fixed to said drawbar, certain of said brackets being adapted for detachable connection to the trailing ends of the lower draft links, an upstanding strut fixed medially of said drawbar and adapted for detachable connection with the compression link on the tractor, a pair of reversible disc gangs, means pivotally supporting said gangs from said drawbar for pivotal as well as longitudinal sliding adjustment relative thereto, an angling control shaft journaled in said forwardly extending brackets, angling control arms fixed to said angling control shaft but adjustable longitudinally thereof, and a pair of angle draft links mechanically interposed between said angling control shaft and said gangs.

References Cited in the file of this patent

UNITED STATES PATENTS

| | | |
|---|---|---|
| 540,550 | Hisle | June 4, 1895 |
| 1,007,496 | Sharp | Oct. 31, 1911 |
| 1,297,302 | White | Mar. 11, 1919 |
| 1,568,896 | McKay | Jan. 5, 1926 |
| 1,704,929 | Towner | Mar. 12, 1929 |
| 1,760,940 | English | June 3, 1930 |
| 2,233,665 | Hoffman | Mar. 4, 1941 |
| 2,320,624 | Love | June 1, 1943 |
| 2,596,579 | McKay | May 13, 1952 |
| 2,652,761 | Gibson | Sept. 22, 1953 |